Patented Oct. 3, 1922.

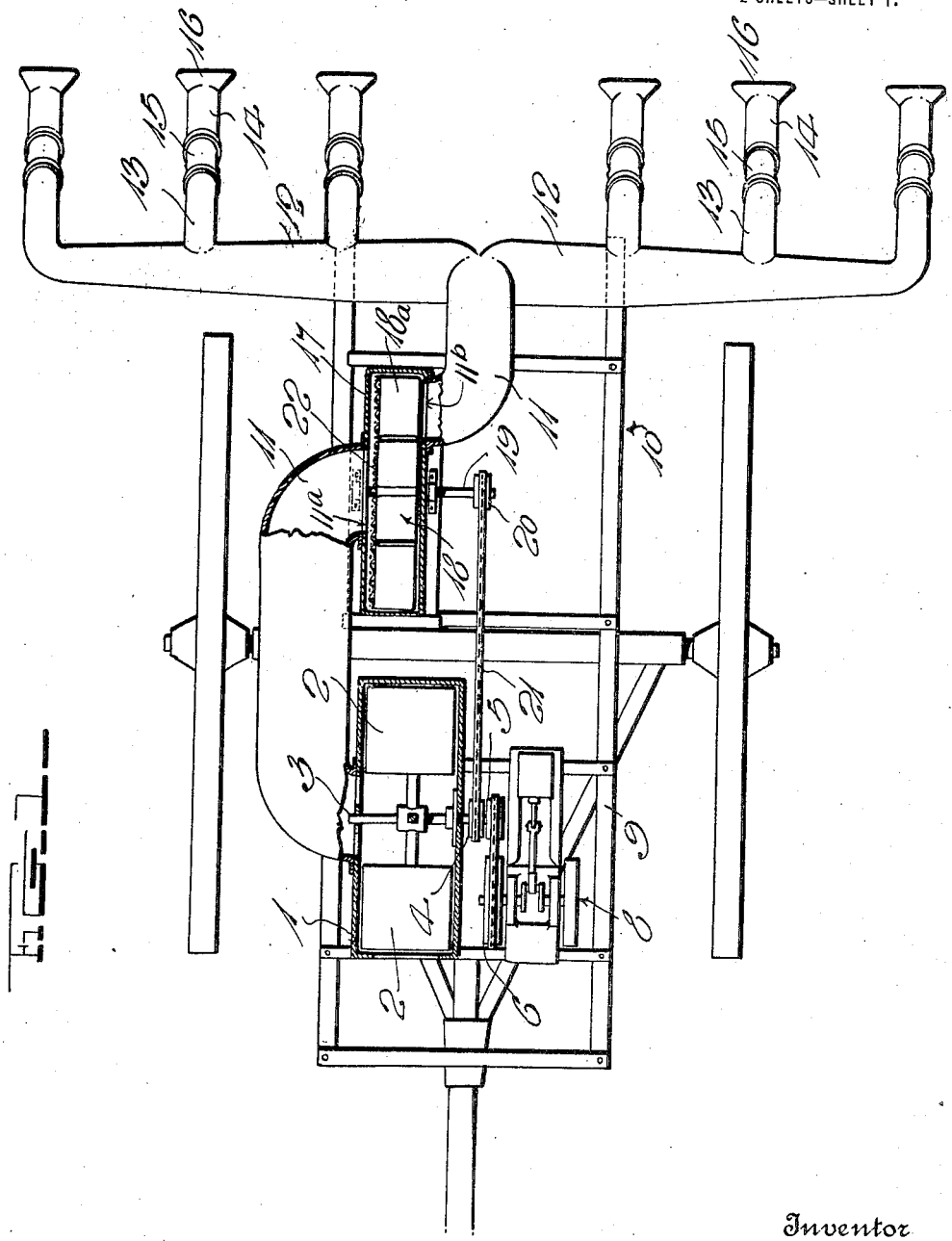

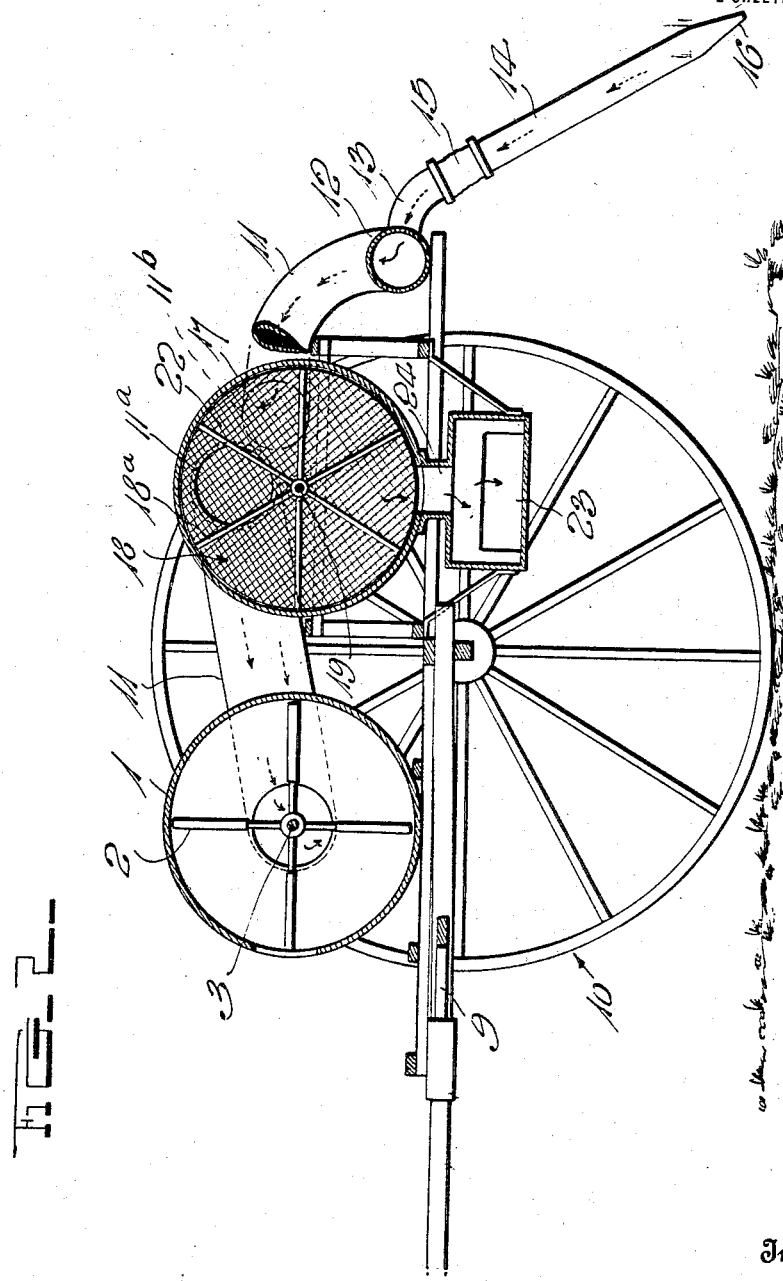

1,431,108

UNITED STATES PATENT OFFICE.

JOHN B. FENLEY, OF NACOGDOCHES, TEXAS.

BOLL-WEEVIL EXTERMINATOR.

Application filed May 2, 1921. Serial No. 466,161.

*To all whom it may concern:*

Be it known that I, JOHN B. FENLEY, citizen of the United States, residing at Nacogdoches, in the county of Nacogdoches and State of Texas, have invented certain new and useful Improvements in Boll-Weevil Exterminators; and I do declare the following to be a full, clear, and exact description of the invention such as will enable others skilled in the art to which it appertains to make and use the same.

This invention relates to an improved device for collecting insects such as boll weevils, from cotton plants and destroying the same, being also adaptable for collecting unblown buds and the like which have been shaken off of the plants.

The principal object of the invention is to generally improve upon devices of this class by the provision of one of extreme simplicity and durability which effectively accomplishes the desired ends and is practical and convenient to operate.

Another and important object of the invention is to provide a device of this class embodying a wheeled support on which a suction-creating device is mounted, an insect conveyor conduit leading from this device and including down pipes portions for extending into close proximity to the ground or plants for collecting insects, together with a novel separator arranged in the conduit, the same serving to prevent the insects from being drawn into the suction-creating drum or device.

Another object of the invention is to provide an exterminator of this class wherein the separator includes a rotary swatter for striking the insects as they enter and killing them and then dropping them from the blades of the swatter into the deposit box, from which they can be afterward removed and disposed of in any desirable way.

Other objects and advantages of the invention will be apparent during the course of the following description.

In the accompanying drawings forming a part of this specification and in which like numerals are employed to designate like parts throughout the same:

Figure 1 is a top plan view, with parts broken away and shown in section, of an exterminating device constructed in accordance with my invention.

Figure 2 is a central longitudinal vertical sectional view taken through the device.

In carrying out the invention, I make use of a suction-creating drum 1 in which a fan 2 is rotatably mounted, the latter including a shaft 3 extending beyond one side of the drum and having sprockets or other suitable driving elements 4 and 5 thereon, the sprocket 5 cooperating with a larger sprocket wheel 6 and being driven from the latter by means of a chain. The large sprocket wheel 6 is driven by a small gasoline motor or the like 8 supported on the frame 9 of a wheeled support, indicated generally by the numeral 10. Here, it may be mentioned that it is of course understood that any other suitable means may be employed for imparting rotation to the fan 2. However, effective results have actually been accomplished by the employment of the construction and arrangement so far shown and described. A plurality of pipes lead from the drum 1 to the ground or near the latter so as to collect insects and unblown buds and the like off of the ground as is usual. These pipes may be divided by calling the ones numbered 11, the main conduit, the ones numbered 12 branches, and the short depending pipes 13, intakes. As is usual, the depending intakes have spouts 14 detachably connected therewith by the flexible stockings 15, the lower free ends of said spouts being flattened as indicated at 16 for effectively collecting only the insects and unblown buds.

The parts of the invention so far described are not to be emphasized since the novelty, as before indicated, resides in the provision of means to be associated with the parts described, this means serving to separate and effectively destroy the insects and prevent them from being drawn into the suction-creating drum 1. In carrying out this part of the invention, I make use of a casing or drum 17 somewhat like the one already described, this casing having a suction inlet opening 11$^a$ in one side and an insect intake opening 11$^b$ in its opposite side with which pipes of the main conduit 11 communicate. In this drum is a rotary fan-like member 18 having a shaft 19 extending through one side of the casing, this shaft having sprocket-wheel 20 thereon with which the chain 21 communicates, the latter being driven from the aforementioned sprocket-wheel 4. This rotary member may be conveniently termed a swatter since it strikes the insects as they are drawn into the separator casing and kills them. It is to be noted that the radial blades 18ª of the swatter are of uniform width throughout their length and no matter where the insects enter the casing, they are struck by said blades. The separator in addition to embodying these parts, includes a disk-like screen or strainer 22 which is arranged within the casing and covers one of the side openings as shown, preventing insects from being drawn through this opening and through the pipe 11 into the suction-creating drum. The screen could, of course be rigidly mounted in the casing 17. However, by preference, I prefer to secure it to the blades of the fan to insure rotation of the latter. With this construction, it will be seen that when the insects are drawn into the casing 17, they will be brought against a screen 22 and dropped onto the blades 18ª and during the course of rotation of the latter, dropped off of them into a deposit box 23 secured to the frame of the vehicle or wheeled support as better shown in Fig. 2. Having mentioned the box, it may be stated that the same is constructed of metal and includes a neck 24 which communicates with an opening in the bottom of the casing 17 to permit the insects to be dropped from the latter into the box. It may also be stated that this box may be supported from the vehicle in any number of ways.

It is hardly necessary to point out that when the fan 2 is set into rotation by starting the engine 8, suction is created in the pipes and the insects thus drawn through the spouts and pipes into the separator casing 17. As they enter this casing, they are struck by the blades 18ª and killed or are thrown against the screen 22, which prevents them from dropping into the casing but causes them to deposit on the above named blades. As before indicated, as the latter rotate, the insects and other foreign particles which have deposited on them will drop by gravity off of the same when they assume vertical positions over the outlet neck 24. Consequently, all the insects and other foreign particles will be dropped into the deposit box from which they can be removed and destroyed in any suitable way. It may be well to mention here that the deposit box will, of course, be so constructed as to enable the insects to be conveniently removed therefrom in a short time.

A careful consideration of the description taken in connection with the accompanying drawings will enable persons skilled in the art to which the invention relates to obtain a clear understanding of the invention. In view of this, a more lengthy and detailed description is thought unnecessary.

Since probably the best results may be obtained with the construction and arrangement herein shown and described, I take this as a preferred embodiment of the invention. However, I wish it understood that minor changes coming within the scope of the subjoined claims may be resorted to.

I claim :—

1. The combination with a wheeled support, an inclosed suction creating device mounted thereon and having a conduit leading therefrom; of an insect separating casing arranged on the support in rear of said device, said conduit communicating with said casing, an insect conveying pipe leading from said casing, and a rotary swatter arranged in said casing for killing the insects as they enter the casing through the pipe.

2. The combination with a wheeled support, a suction creating device mounted thereon, and an air conduit leading from said device; of a separator drum for the insects arranged on said support, said conduit communicating with said drum, an insect conveying pipe leading from said drum, a rotary swatter arranged in the latter for killing the insects as they enter, and means carried by said swatter for compelling the insects to be struck by the swatter, said means also preventing passage of the insects from the drum through said suction conduit.

3. A device of the class described comprising a separator drum, means for collecting and conveying the insects into the drum, means for creating a suction in the drum to draw the insects into the same, a screen for covering the suction inlet opening, a bladed swatter rotatably mounted in the drum for striking and killing the insects as they enter the drum, the blades of said swatter being substantially the same in width as the drum, and deposit means for the dead insects associated with the drum.

4. The combination with a wheeled support, a suction creating device mounted thereon, and an air conduit leading from said device; of a separator drum mounted on said support and being provided with side openings, said conduit communicating with one of said side openings, an insect conveying pipe communicating with the other opening, a rotary swatter arranged in said drum, and a screen carried by the swatter and covering the first named side opening with which said conduit is connected to compel the insects to be struck by the blades of the swatter and to prevent them from being sucked through said conduit.

5. The combination with a wheeled support having a suction creating device mounted thereon and an air conduit leading therefrom; of a separator drum for the insects supported on said support in rear of said device, said conduit being connected at its rear end with said drum, the latter being provided with an intake opening for the insects, means for collecting insects leading from the opening, and means arranged in said drum for striking and killing the insects as they enter the same through said intake opening.

6. The combination with a movable support, a suction creating device, and a conduit leading therefrom; of a separator drum for the insects having connection with said conduit, said drum being provided with an opening through which the insects are drawn by the suction, and a rotary bladed element arranged inside of the drum, the blades thereof being of a uniform width throughout their length to insure that the insects will be struck thereby regardless of at what point they enter the drum.

7. A device of the class described comprising a wheeled support, a suction creating drum supported thereon, an insect separating casing also supported on the support, said casing being formed with side openings, an air conduit leading from said suction drum to one of said openings in said casing, an insect conveying pipe leading from the remaining opening in the casing, a rotary bladed swatter arranged in said casing for striking and killing the insects as they enter, a screen carried by the blades of said swatter to compel the insects to be struck by the blades as they enter the casing and to prevent them from being sucked into the air conduit, and a collecting box arranged beneath and communicating with said casing for collecting the insects.

8. A device of the class described including a separator drum having openings for connection to a suction device and insect conveying means, a rotary bladed swatter in said drum for striking and killing the insects as they enter the same.

9. The structure of claim 8, together with a screen carried by the swatter for the purposes set forth.

In testimony whereof I have hereunto set my hand.

JOHN B. FENLEY.